United States Patent

Nolfi et al.

(10) Patent No.: US 9,476,534 B2
(45) Date of Patent: Oct. 25, 2016

(54) SELECTIVELY PRESSURIZABLE FOREIGN MATERIAL EXCLUSION DEVICE

(71) Applicant: Advanced F.M.E. Products, Inc., Mentor, OH (US)

(72) Inventors: Thomas J. Nolfi, Chardon, OH (US); Mario M. Nolfi, Willoughby, OH (US)

(73) Assignee: ADVANCED F.M.E. PRODUCTS, INC., Mentor, OH (US)

( * ) Notice: Subject to any disclaimer, the term of this patent is extended or adjusted under 35 U.S.C. 154(b) by 0 days.

(21) Appl. No.: 14/699,237

(22) Filed: Apr. 29, 2015

(65) Prior Publication Data

US 2015/0316194 A1 Nov. 5, 2015

Related U.S. Application Data

(60) Provisional application No. 61/986,506, filed on Apr. 30, 2014.

(51) Int. Cl.
*F16L 55/12* (2006.01)
*F16L 55/10* (2006.01)
*F16L 55/11* (2006.01)
*F16L 55/128* (2006.01)
*F03B 11/00* (2006.01)
*F16L 55/134* (2006.01)

(52) U.S. Cl.
CPC ............ *F16L 55/1141* (2013.01); *F03B 11/00* (2013.01); *F16L 55/1283* (2013.01); *F16L 55/134* (2013.01)

(58) Field of Classification Search
CPC . F16L 55/134; F16L 55/1141; F16L 55/1283
USPC ............ 138/89, 90, 104; 215/355, 230, 364; 220/789, 801, DIG. 19
See application file for complete search history.

(56) References Cited

U.S. PATENT DOCUMENTS

| 3,726,319 | A | * | 4/1973 | Patterson | F16L 55/134 138/90 |
| 4,423,754 | A | * | 1/1984 | Carter, Jr. | F16L 55/132 138/93 |
| 4,612,961 | A | * | 9/1986 | Vetter | F16K 7/10 138/89 |
| 6,506,014 | B1 | | 1/2003 | Nolfi et al. | |
| 6,824,356 | B2 | | 11/2004 | Nolfi et al. | |
| 7,533,698 | B2 | * | 5/2009 | Nolfi | F02C 7/00 138/104 |
| 8,967,203 | B2 | | 3/2015 | Nolfi et al. | |
| 2003/0021678 | A1 | * | 1/2003 | Nolfi | F02C 7/00 415/170.1 |
| 2004/0028523 | A1 | * | 2/2004 | Nolfi | F02C 7/00 415/121.2 |
| 2007/0059162 | A1 | * | 3/2007 | Nolfi | F02C 7/00 415/170.1 |

(Continued)

*Primary Examiner* — Patrick F Brinson
(74) *Attorney, Agent, or Firm* — Hudak, Shunk & Farine Co. LPA (57) ABSTRACT

A foreign material exclusion device adapted for use in an opening or cavity of a system or construction, for example a tube, pipe or the like that can be utilized in one embodiment to prevent entry of debris into a particular area of the construction, the device having a body that is adapted to seal a first side of the cavity from a second side of the cavity, the device further including a body comprising a resilient material that can be compressed to fit into the desired opening or cavity and then can be re-expanded to provide a snug fit about the opening such that the device supports itself, the device further including an inflatable apparatus operatively connected to the body, wherein upon inflation, the apparatus contacts desired surfaces of the construction and aids in maintaining the device at a desired location within the system or construction and also aids in forming a desired seal.

16 Claims, 3 Drawing Sheets

(56) References Cited

U.S. PATENT DOCUMENTS

2007/0284011 A1* 12/2007 Freyer ................ E21B 33/1208
  138/90

2011/0169630 A1* 7/2011 Nolfi ...................... F01D 17/02
  340/539.1
2011/0315258 A1* 12/2011 Tomimbang ........ F16L 55/1283
  138/93

* cited by examiner

SELECTIVELY PRESSURIZABLE FOREIGN MATERIAL EXCLUSION DEVICE

FIELD OF THE INVENTION

The present invention relates to a foreign material exclusion device adapted for use in an opening or cavity of a system or construction, for example a tube, pipe or the like that can be utilized in one embodiment to prevent entry of debris into a particular area of the construction, the device having a body that is adapted to seal a first side of the cavity from a second side of the cavity, the device further including a body comprising a resilient material that can be compressed to fit into the desired opening or cavity and then can be re-expanded to provide a snug fit about the opening such that the device supports itself, the device further including an inflatable apparatus operatively connected to the body, wherein upon inflation, the apparatus contacts desired surfaces of the construction and aids in maintaining the device at a desired location within the system or construction and also aids in forming a desired seal.

BACKGROUND OF THE INVENTION

Foreign material exclusion devices have been developed in order to minimize or prevent various materials or debris, which are not designed to be present in a construction or system, from adversely affecting the construction or system, especially during repair or maintenance. Examples of various foreign material exclusion devices are set forth for example in the following U.S. Patents and Publications.

U.S. Pat. No. 6,506,014 relates to a device which can be utilized to temporarily seal substantially any opening on a turbine which is being assembled or repaired. The foreign material exclusion device advantageously maintains fail-safe integrity of desired portions of a turbine. Protection of the sensitive areas of a turbine prevents possible hazardous malfunctions or explosions of a turbine. The foreign material exclusion device is substantially elastic or resilient and can be compressed to fit into a desired opening and can be re-expanded to provide a snug fit about an opening.

U.S. Pat. No. 6,824,356 relates to a device which can be utilized to temporarily seal substantially any opening on a turbine which is being assembled or repaired. The foreign material exclusion device includes a main body, preferably formed from a foamed polymer or rubber. The foreign material exclusion device is substantially elastic or resilient and can be compressed to fit into a desired opening and can be re-expanded to provide a snug fit about an opening. An extraction member is connected to the main body and is preferably utilized to remove the device from a portion of a cavity of a turbine.

U.S. Pat. No. 7,533,698 relates to a foreign material exclusion device which is adapted to be utilized in tubes, pipes, or the like to prevent entry of debris into a potentially sensitive area of an assembly, such as a turbine assembly utilized in a power plant. In one embodiment, the device is adapted to be connected to a non-moving portion of a rotary milling tool, such as the collet, before a milling operation to prevent milling debris from entering a sensitive portion of a tube or pipe. In a further embodiment, each device of the invention includes a unique identifier or identification element, such as a machine readable bar code or RFID (radio frequency identification) tag, to insure all devices utilized for a particular job are accounted for.

U.S. Patent Application Publication No. 2011/0169630 relates to a foreign material exclusion device adapted for use in a cavity of a system or construction, for example a tube, pipe, or the like, the device having a body that is adapted to seal a first side of the cavity from a second side of the cavity and prevent passage of debris past the body, the device further including a sensor operatively connected to the body and adapted to measure a property of the environment adjacent at least one surface of the device. Methods for utilizing the device to seal a portion of the cavity and to record, and preferably distribute, the data are also described.

An alternative method of sealing or closing a cavity is to utilize inflatable or pneumatically actuated devices such as balloons, bags, or diaphragms. While some inflatable airbags offer advantages such as having desirable strength and strong sealing ability, disadvantages exist. For example, loss of air pressure in an inflatable device can cause sealing failure which can allow debris to access a sensitive or undesired area. Additionally, inflatable devices, in some embodiments, have an edge radius in the area of contact with a surface of a cavity or construction that can retain debris that is difficult to observe and remove prior to device removal.

SUMMARY OF THE INVENTION

In view of the above noted problems, it would be desirable to enhance foreign material exclusion efforts and provide operators with additional tools in order to control debris.

It is a further object of the present invention to provide a foreign material exclusion device having set-up and retraction times, as compared to an inflatable device, that are reduced thereby saving man-hours and thus expenses for an employer. The devices of the present invention provide initial compression sealing to assist in holding the device in place without the need for a person or other device to hold the foreign material exclusion device in place prior to inflating the inflatable apparatus of the device. This feature is especially important in limited access and/or radiological exposure areas wherein limiting worker exposure to radiation is vitally important.

It is an additional object of the present invention to provide a device that maintains a desired position or location within a construction even if the inflatable apparatus suffers a loss of air pressure.

Still a further object of the present invention is to provide a foreign material exclusion device that includes both a resilient body and an inflatable apparatus that collectively provide dual systems or redundancy for debris control.

A further object of the present invention is to provide a device that includes an inflatable apparatus and a resilient body that provides for right angle edge sealing of a construction that in turn allows desirable debris assessment and removal.

Yet another object of the present invention is to provide a foreign material exclusion device including a resilient body and an inflatable apparatus that are connected to a lanyard or extraction member that facilitates removal of the device after use.

An additional object of the present invention is to provide a foreign material exclusion device including a resilient body operatively connected to an inflatable apparatus, wherein a vent is provided on the device between a first side of the cavity and a second side of the cavity yet prevents passage of debris therethrough. This is achieved in one embodiment by providing the inflatable apparatus with an aperture, such as when the apparatus is in the shape of a ring, wherein a portion of the resilient body covers the aperture.

Yet another object of the present invention is to provide a foreign material exclusion device including a body which is substantially elastic or resilient and can be compressed to fit into a desired opening and can be re-expanded to provide a snug fit about the opening thereby substantially sealing the same and preventing foreign material or debris from gaining access to a potentially sensitive area, wherein an inflatable apparatus is operatively connected to the body and can be inflated or expanded to additionally fix or provide a snug fit about the desired opening. An extraction member is preferably connected to the body and is preferably utilized to remove the device from the cavity or opening, generally after a predetermined operation has been conducted. The foreign material exclusion device further includes an identification element that uniquely identifies each device utilized at a particular job site. The identification element can be identifying indicia, a bar code, an RFID tag, or the like. In one embodiment, the identification element provides a signal which can be detected and the location of the foreign material exclusion device can be identified to the user.

Still another object of the present invention is to provide a foreign material exclusion device that includes a resilient body and an inflatable apparatus, wherein the device can be individually identified, tracked, and accounted for during all phases of construction or repairs or the like on a tube, tube bank, boiler, turbine or other assembly. Thus prevention of the foreign material exclusion devices, and debris or foreign material captured thereby, from becoming lost or trapped within an assembly is avoided, and potentially catastrophic losses are avoided.

Another object of the present invention to provide selectively pressurizable foreign material exclusion devices having improvements in traceability, debris control, data collection and transmission.

A further object of the present invention is to provide a selectively pressurizable foreign material exclusion device that can collect and transfer information to a desired location.

Still another object of the present invention is to provide a selectively pressurizable foreign material exclusion device with the ability to seal an opening or cavity such as in a pipe, tube, or other orifice, the device including one or more sensors that can measure a property of the ambient environment in an area relatively near the device.

Yet another object of the present invention is to provide a selectively pressurizable foreign material exclusion device having one or more sensors that can monitor the environment, preferably within a sealed cavity and can, for example measure properties such as pressure, temperature, shock or provide imaging or visual information.

An additional object of the present invention is to provide the selectively pressurizable foreign material exclusion device with a lanyard including electronic wiring, circuiting, etc. that serves as a conduit to relay data to and from one or more sensors of the device as well as to provide power to the sensor. The lanyard also maintains a physical connection of sufficient strength, operatively to the body of device, to be able to retract the device from an opening or cavity without damage and further retain the device should vacuum conditions be encountered.

A further object of the present invention is to provide a selectively pressurizable foreign material exclusion device having a body adapted to seal an opening or cavity in a portion of a system, such as a tube or pipe, and one or more sensors for measuring pressure at a specific location or the difference in pressure between two points, such as on two sides or faces of the device, wherein the sensor is connected to a lanyard which has a transmitter adapted to extend outside of a cavity, wherein the lanyard has a display device connected thereto such that the property or properties measured by the sensor are displayable by the display device, and wherein the sensor and display device are powered by one of more of a) a portable power source, such as a battery and b) power available from a standard outlet to which the display device and sensor can be connected via a plug.

Another object of the present invention is to provide a selectively pressurizable foreign material exclusion device having a body adapted to seal an opening or cavity in a portion of a system, such as a tube or pipe, and one or more sensors for measuring pressure at a specific location or the difference in pressure between two points, such as on two sides or faces of the device, wherein the sensor is in communication with a further device, namely a transmitter, so that the information obtained by the sensor can be viewed at a remote location, preferably by a reader. The device can transfer information either via a wire or wireless communication. Furthermore, in some embodiments, the sensor information can be stored and thereby recorded.

Still a further object of the present invention is to provide a selectively pressurizable foreign material exclusion device including a body adapted to seal an opening or cavity in a portion of a system, such as a tube or pipe, and a sensor in communication with a further device so that the information obtained by the sensor can be viewed at a remote location and further having a sensor that is able to measure impact or provide imaging.

In one aspect a foreign material exclusion device is disclosed comprising a body that is adapted to seal a first side of a cavity in a construction or system from a second of side of said cavity, said body comprising a resilient or elastic material that can be compressed to fit into said cavity and then can be re-expanded to self-support the device within said cavity, said device further including an inflatable apparatus operatively connected to said body, wherein upon inflation, said inflatable apparatus also contacts desired surfaces of said construction or system and aids in maintaining said device at a desired location within said construction or system and also aids in forming a controlled seal between the first and second sides of the cavity.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The foreign material exclusion devices can be utilized wherever it is desired to exclude foreign material from a construction and/or acquire information about a property or condition associated with an area adjacent the device. The foreign material exclusion devices are particularly adapted to be utilized in tubes, pipes, machine or construction apertures, or the like in order to protect from intrusion of foreign material or debris into a predetermined area of the tube, pipe or the like, and to provide information about a property associated with a portion of the cavity. For example, it is desirable to protect a turbine at a power plant from debris as the turbine can be catastrophically damaged by parts, metal shavings, or even foreign material exclusion devices that are left in the construction during repair or maintenance. Foreign material exclusion devices are typically utilized during construction, assembly, repair, or the like of a portion of a construction such as, but not limited to, a turbine, pump, fan, housing boiler tubes, or other devices with access openings and cavities. The foreign material exclusion devices of the invention are designed to be removed after construction, repair or maintenance.

Figure 1:
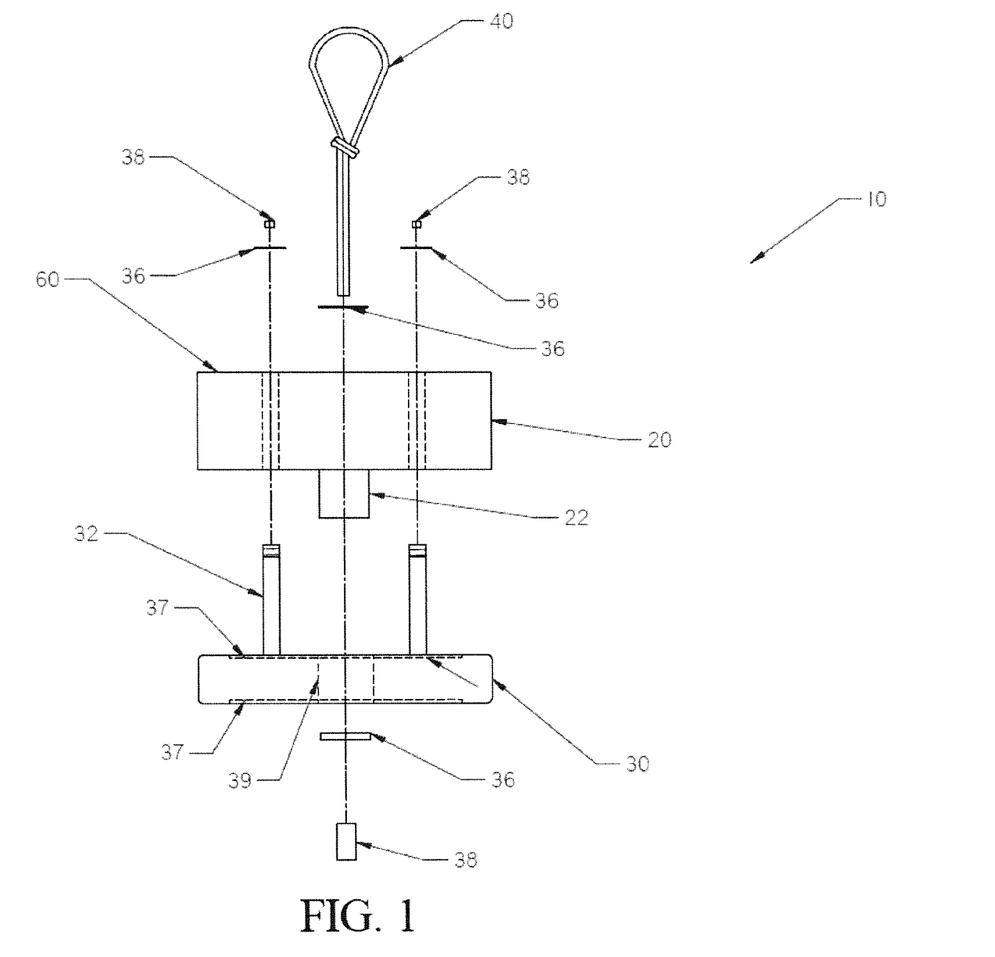
FIG. 1 is an exploded side view of one embodiment of a selectively pressurizable foreign material exclusion device including a substantially cylindrical resilient body and an inflatable apparatus.
Figure 2:
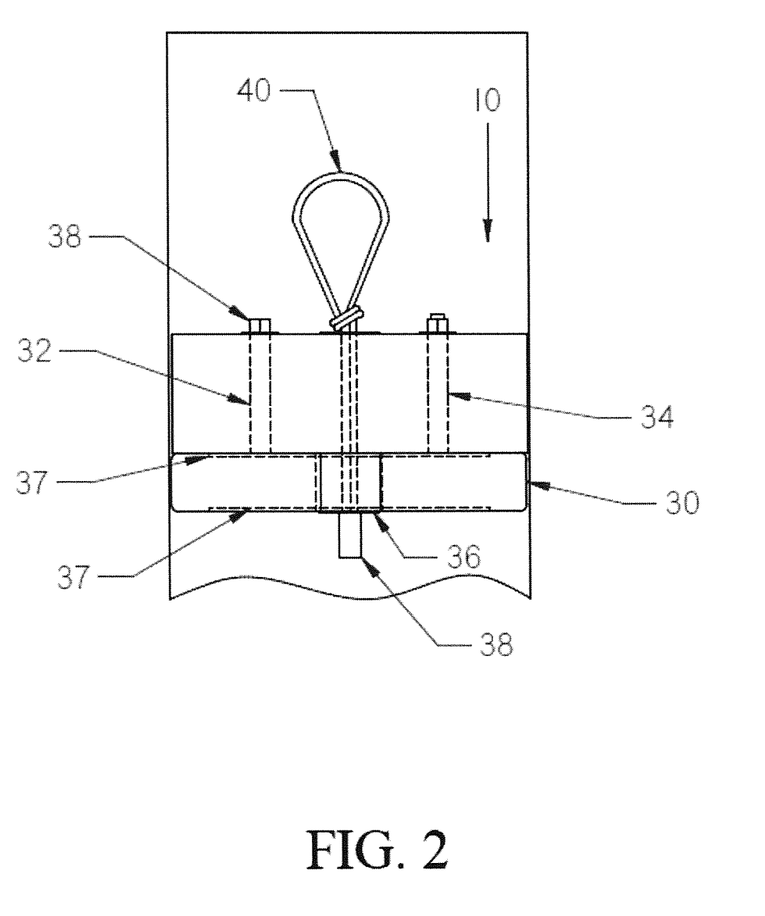
FIG. 2 is a vertical cross-sectional view through a tube or pipe illustrating a selectively pressurizable foreign material exclusion device removably secured therein.

Referring now to the drawings, wherein like numerals refer to like or similar features throughout the several views, FIG. 1 illustrates one embodiment of selectively pressurizable foreign material exclusion device 10 comprising a body 20 and an inflatable apparatus 30 that is operatively connected, see FIG. 2 for example. In various embodiments, the device 10 includes an extraction member 40 and/or an identification element 50, see FIG. 3.

The composition of body 20 of the exclusion device is generally a polymer, a rubber, or a polymer or rubber foam. It is important that body 20 is elastic or resilient in nature so that it can be compressed to fit into a desired opening, and yet re-expand to provide a snug fit within or about the opening. The resiliency of body 20 allows the foreign material exclusion device to hold itself in place in a predetermined location or orifice.

The actual size dimensions, i.e. the length, width, and thickness of body 20 of foreign material exclusion devices 10 of the present invention will vary depending on the size and shape of the orifice, tube, opening, etc. which is to be protected or isolated. That is, body 20 of foreign material exclusion device 10 is not limited to one specific geometric or random shape or size such as a cylinder, cube, block, or the like, but is custom tailored or profile fit to the dimensions of generally each cavity or turbine assembly orifice. Body 20 is dimensioned to provide a resilient snug fit with the above-mentioned orifice which thereby provides a barrier to the entrance of foreign materials. Foreign materials can generally be defined as any object, particle or the like such as, but not limited to, nuts, bolts, metal bits, debris, hand tools, sockets, measuring devices, or any other material not designed to be located in a desired area of a turbine assembly. The thickness of body 20, generally measured in a direction parallel to the longitudinal direction of walls of tube 100 such as shown in FIG. 2, is sufficient to maintain a self-supporting snug, or tight fit of the device about the desired opening, with body 20 being generally from about 0.5 or about 1 to about 12, desirably from about 2 to about 8, and preferably from about 4 to about 6 inches thick. Dimensions can vary widely by application, with the primary goal of foreign object exclusion requiring sufficient strength to retain the heaviest object used in that portion of the protected device.

Figure 3:
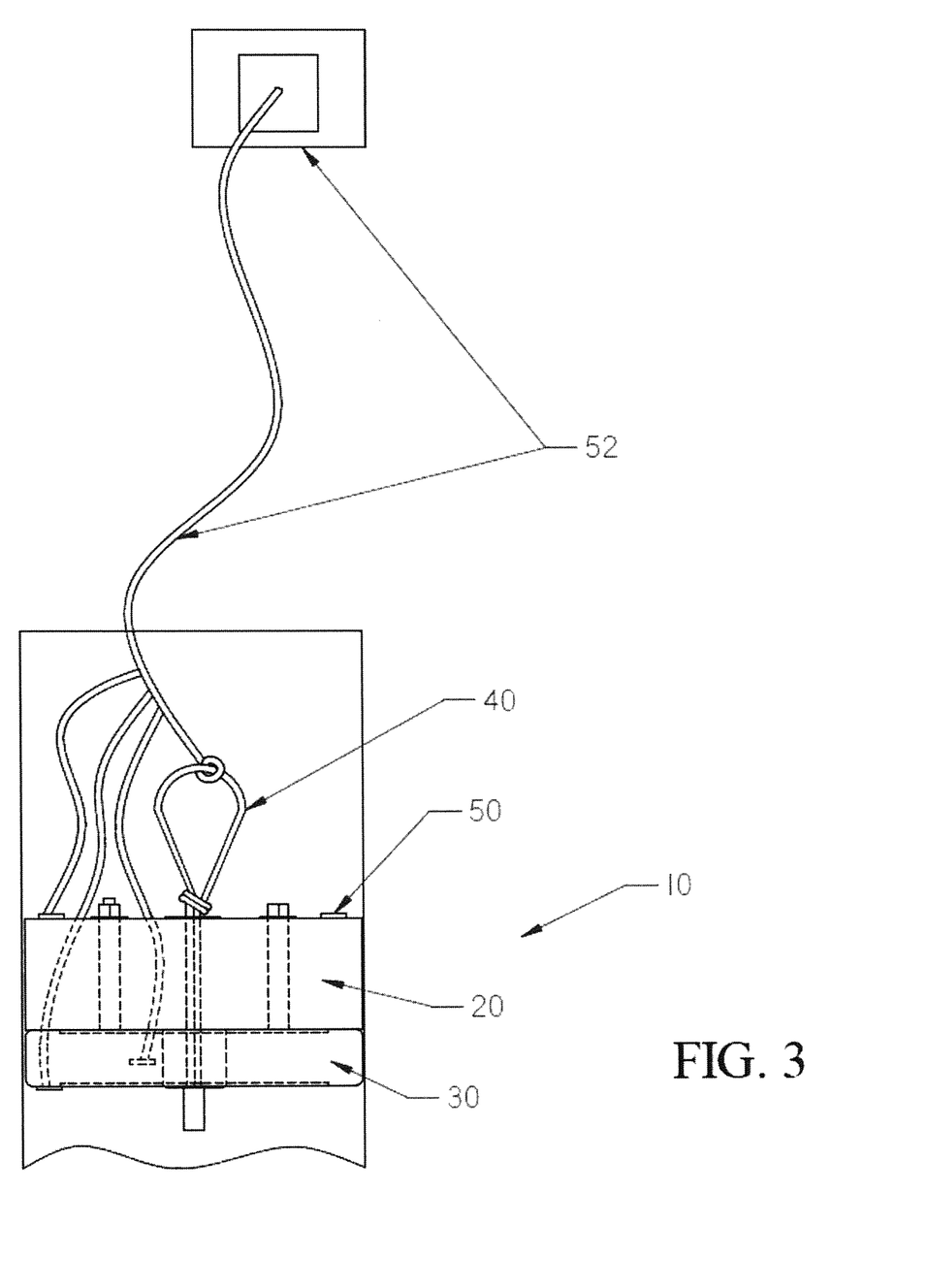
FIG. 3 is a vertical cross-sectional view through a tube or pipe illustrating a selectively pressurizable foreign material exclusion device removably secured therein and including a trackable identification element and also sensors connected to each of an upper surface and lower surface of the device, wherein an additional sensor is located within the inflatable apparatus that is suitable for measuring pressure therein, with the sensors operatively connected to a display.

In an important aspect of the present invention, the device 10 is provided with at least one portion thereof having a substantially right angle edge. That is, two sides or surfaces of the device meet at a right angle (about 90°) or an angle of about 80° to about 100° in order to ensure that any debris that may enter a portion of the cavity will remain on one of the upper surfaces of the device and not become lodged, for example between a side surface of the device and a wall of the cavity. For example, as illustrated in FIGS. 2 and 3, for sake of explanation the body 20 includes a side surface and an upper surface that meet at an angle of about 90°. Any debris entering the cavity from above will be trapped on the upper surface of the body 20. As a seal is formed between the side wall of the cavity and side surface of the body which prevents foreign material or debris from becoming lodged between the device 10 and the wall of tube 100. In one preferred embodiment two surfaces of the body, for example a side surface and an upper surface provide the desired angled edge.

Body 20 of the material exclusion device of the present invention is generally formed from a polymer or rubber, and is preferably a foam or foam like material. Foams are cellular materials generally having small hollow spaces which occur during manufacture of the foam. If the cells are fully surrounded by cell walls, the foam is called closed cell foam. In mixed cell foams, the cell walls are partially perforated. In open cell foams, the cells have gas phase connections to each other. Any of the above-mentioned foam types can be utilized in the present invention so long as the foams can be resiliently compressed and prevent the foreign material from entering a predetermined area of the turbine. Generally, open cell foams are preferred as they are more flexible and elastomeric when compared to closed cell foams which tend to be compression resistant.

Suitable polymer compositions which can be foamed to form the body of the present invention include polyethylene, e.g. low density polyethylene and high density polyethylene (HDPE), polypropylene, and copolymers of ethylene or propylene and a monoethylenically unsaturated monomer copolymerizable therewith. Other suitable polyolefins include branched polypropylene homopolymers and branched copolymers of polypropylene. Examples also include copolymers of ethylene and acrylic acid or methyl acrylic acid and $C_1$-$C_4$ alkyl esters or ionomeric derivatives thereof; ethylene vinyl-acetate copolymers; ethylene/carbon monoxide copolymers; anhydride containing olefin copolymers of a diene; copolymers of ethylene and an alpha-olefin having ultra-low molecular weight (i.e., densities less than 0.92 g/cc); blends of all of the above resins; blends thereof with polyethylene (high, intermediate or low density), etc.

Other suitable polymeric compositions which may be used in the practice of the invention include, but are not limited to, polyesters, polyamides, polyvinylchloride, polyvinylidene chloride, polycarbonates, polyurethanes, and polystyrene resins.

Rubbers include copolymers of ethylene and propylene and can be prepared by known addition polymerization techniques, including the use of small amounts of a diene such as butadiene. Additional rubber or elastomeric components include various conjugated dienes having from 4-8 carbon atoms such as isobutylene, butadiene, and ethylene/propylene/diene interpolymers may be included in the blend if desired. Rubbers include the aromatic containing rubbers such as styrene, butadiene rubber and the like. Moreover, additional components such as crosslinking agents designed to provide latent crosslinking of the ethylenic or propylenic polymer, such as silane functional crosslinking agents, or covalent or ionic crosslinking agents, may be included if desired.

The thermoplastic polymer material or blend is melt processed in a conventional manner by feeding, melting, and metering into a conventional melt processing apparatus such as an extruder. A volatile blowing agent and an optional crosslinking agent are mixed with the polyolefin polymer or blend under a pressure suitable to form a flowable gel or admixture. A crosslinking agent may be added in an amount which is sufficient to initiate crosslinking and raise the pressure of the mixture to less than that pressure which causes melt fracture of the polymer to occur. The term "melt fracture" is used in the art to describe a melt flow instability of a polymer as it is extruded through a die, which flow instability causes voids and/or other irregularities in the final product. Any other known methods for producing foam compositions can also be utilized to form the foam utilized in the present invention.

The foam blends are generally prepared by heating the desired polymer or rubber to form a plasticized or melt polymer material, incorporating therein a blowing agent to form a foamable gel, and extruding the gel through a die to form the foam product. Prior to mixing with the blowing agent, the resin or blend is heated to a temperature at or above its glass transition temperature or melting point. The blowing agent may be incorporated or mixed into the melt polymer material by any means known in the art, such as with an extruder, mixture, blender, or the like. The blowing agent is mixed with the melt polymer material at an elevated pressure sufficient to prevent substantial expansion of the melt polymer material and to generally disperse the blowing agent homogeneously therein. Optionally, a nucleating agent may be blended in the polymer melt or dry blended with the polymer material prior to plasticizing or melting. The foamable gel or melt is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam product. The zone of lower pressure is at a pressure lower than that in which the foamable gel is maintained prior to extrusion through the die. The lower pressure may be super-atmospheric or sub-atmospheric (vacuum), but is preferably at an atmospheric level.

The polymer or rubber foam may be open or closed-celled, as desired. The percentage of open cells can be controlled, as is well known in the art, by appropriate selection of blowing agents, additives, polymers, and processing parameters, such as temperatures, pressures, and extrusion rates. One preferred foam of the present invention is polyester and is available from Orbis Manufacturing of Mentor, Ohio.

While the density of the foam can vary, the foams of the present invention are generally considered lightweight and range generally from about 1 to about 200 or 300 kg/m$^3$, desirably from about 5 to about 150 kg/m$^3$, and preferably from about 10 to 20 to about 50, about 75, or about 100 kg/m$^3$.

It is also possible to add various additives such as inorganic fillers, pigments, anti-oxidants, acid scavengers, ultra-violet absorbers, flame retardants, surfactants, processing aids, extrusion aids and the like as known to those of ordinary skill in the art.

Other additives include inorganic substances such as calcium carbonate, talc, clay, titanium oxide, silica, barium sulfate, diatomaceous earth and the like; carbon dioxide generated by the combination of a bicarbonate or a carbonate of sodium, potassium, ammonium or the like and an inorganic or organic acid such as boric acid, citric acid, tartaric acid or the like; thermal decomposition type chemical foaming agents such as azodicarbonamide, benzenesulfonyl hydrazide, toluene-sulfonyl hydrazide; and the like.

The volatile foaming agents usable in this invention generally have a boiling point temperature range of −90° C. to +80° C., and include, but are not limited to, aliphatic hydrocarbons such as n-pentane, isopentane, neopentane, isobutene, n-butane, propane, ethane and the like; and fluorochlorinated hydrocarbons such as dichlorotetrafluoroethane, trifluoroethane, trichloromonofluoromethane, dichlorodifluoromethane, dichloromonofluoromathane, and the like. Among them, the non-fully halogenated hydrocarbons are preferred because of environmental considerations. Particularly preferred among the non-fully halogenated hydrocarbons are partially or fully fluorinated hydrocarbons and non-fully halogenated fluorochlorinated hydrocarbons. Examples of these include 1-chloro-1,1-fluoro-ethane, 1,1,1,2-tetrafluoroethane and 1,1-difluoroethane. Particularly preferred among the aliphatic hydrocarbons are isobutene and isobutene/n-butane mixtures. Other blowing agents which may be employed include alcohols such as methanol and ethanol. Also contemplated are inorganic blowing agents such as carbon dioxide, water, nitrogen, argon and combinations thereof, as well as combinations of these inorganic blowing agents with hydrocarbon and/or halogenated hydrocarbon blowing agents. Also decomposable blowing agents, such as azobisformamide, may be incorporated with the volatile foaming agents. Mixtures of any or all of these volatile foaming agents are also contemplated within the scope of the invention. Also contemplated are combinations including water and/or carbon dioxide as the primary blowing agent.

Examples of various bodies, retaining members, etc. are set forth in U.S. Pat. Nos. 6,506,014 and 6,824,356, both to Nolfi et al., herein fully incorporated by reference.

Extraction member 40 is connected to body 20 through a fastener 38 to allow the foreign material exclusion device to be removed from its location in the turbine assembly once the device is no longer needed. Extraction member 40 is adapted to be removably connected to a rope, string, line, hook, cable, or other retrieval member which can be pulled on by a person in order to allow extraction of the foreign material exclusion device 10. Any number of extraction members 40 can be attached to body 20. Generally, an extraction member forms a loop which is attached to body 20. As shown in FIG. 1, two ends of extraction member 40 have each been inserted through the body 20. Extraction member 40 is generally a rope, line, or cable made from any woven or nonwoven, natural fiber, such as cotton, or synthetic material such as nylon or non-foamed thermoplastic as stated hereinabove. Nylon is preferred in one embodiment.

Optionally, but preferably, a flame retardant, flame resistant, or flame quenching coating or covering 60 is applied to any of the foreign material exclusion devices 10 described with this application, preferably on at least body 20 thereof. The flame retardant coating or covering 60 can be applied to one or more sides of the body, especially the portion thereof which can be exposed to high temperature debris, chips, filings, etc., such as from a welding or cooling process on the turbine assembly or repaired boiler tubes or pipe. The coating or covering 60 is also heat resistant. As illustrated in FIG. 1, the foreign material exclusion device 10 includes a flame retardant, resistant, or quenching coating 60 on the top surface thereof. The coating or covering 60 is any suitable thickness to provide the desired flame or heat resistant properties. In one embodiment, the coating or covering 60 is on top of or in surface contact with at least a portion of the device, and in a second embodiment, saturates a portion of the body of the device in addition to being present on a surface. Coating or covering 60 on the foreign material exclusion device 10 has a sufficient thickness to achieve the desired goal of providing flame retardant, flame resistant, or the like properties. Coating or covering 60 thickness may vary from surface to surface and vary on a single surface, and ranges generally from about 0.010 to about 0.25 inches, desirably from about 0.020 to about 0.20 inches, and preferably from 0.05 to about 0.15 inches.

The inflatable apparatus 30 is connected to body 20. The inflatable apparatus can be formed from any material that can hold air for a desired period of time. Suitable materials include, but are not limited to, polymers, rubbers, and elastomers. For example as illustrated in FIGS. 1 and 2, inflatable apparatus 30 includes at least one valve, such as in the form of a valve stem 32 that is extended through a first side of the body and out of a second side of the body, such as through the vertical height of body 20 whereby the inflatable apparatus 30 can be secured to the body 20 by a suitable fastener 38, such as a cap or nut that is adapted to engage valve stem 32. A washer or other retaining member can be utilized if desired.

In a further embodiment, the body 20 includes a projection 22 that extends outwardly from a main portion of the body and into an aperture 39 of inflatable apparatus 30. The projection is cylindrical in one embodiment. The figures illustrate the cylindrical projection 22 extending through the cylindrical aperture in the inflatable apparatus 30.

The aperture 39 also allows the device 10 to include a vent to allow air pressure to be stabilized on either side of the device 10, for example when the body comprises an open cell foam that allows air passage therethrough. The extraction member 40 also connects body 20 to inflatable apparatus 30 as a portion of the extraction member 40 extends through each of the body 20 and inflatable apparatus 30 and prevents separation thereof, such as through the use of fastener 38 which is connected to a distal end of the extraction member 40. Various washers 36 can be utilized to prevent the displacement of the body 20 from the inflatable apparatus 30.

The inflatable apparatus 30 can also include one or more rigid sections 37, such as in the form of a plate of any shape that aids in ensuring the apparatus 30 expands laterally outward towards a surface of a cavity or other construction upon inflation.

As illustrated in FIG. 3, the selectively pressurizable foreign material exclusion devices of the present invention can include trackable identification element 50 and/or sensors 52 adapted to measure a property of the environment adjacent at least one surface of the device as set forth in U.S. Pat. No. 7,533,698 and U.S. Publication No. 2011/0169630, each fully herein incorporated by reference.

In accordance with the patent statutes, the best mode and preferred embodiment have been set forth; the scope of the invention is not limited thereto, but rather by the scope of the attached claims.

What is claimed is:

1. A foreign material exclusion device, comprising:
a body that is adapted to seal a first side of a cavity in a construction or system from a second of side of said cavity, said body comprising a resilient or elastic material that can be compressed to fit into said cavity and then can be re-expanded to self-support the device within said cavity, said device further including an inflatable apparatus operatively connected to said body, wherein upon inflation, said inflatable apparatus also contacts desired surfaces of said construction or system and aids in maintaining said device at a desired location within said construction or system and also aids in forming a controlled seal between the first and second sides of the cavity, wherein the inflatable apparatus includes an aperture between a first side and second side that allows air not within the inflatable apparatus to pass through the aperture, and wherein the body includes a projection that extends outwardly and downwardly from a main portion of the body and into the aperture of the inflatable apparatus.

2. The device according to claim 1, wherein the body has a first side and an upper surface which abut and form an angle between 80° and 100° in order to provide edge sealing against said cavity.

3. The device according to claim 2, wherein the angle is about 90°.

4. The device according to claim 1, wherein the device further includes an extraction member including a loop that can be utilized to remove the device from the cavity, and wherein the extraction member includes a portion that extends completely through the body and completely through the aperture in the inflatable apparatus.

5. The device according to claim 1, wherein the inflatable apparatus includes a stem that extends through the body from a first side to a second side, and wherein a fastener is connected to a distal end of the stem and operatively connects the inflatable apparatus to the body.

6. The device according to claim 5, wherein the stem includes a valve that allows inflation and deflation of the inflatable apparatus.

7. The device according to claim 1, wherein the inflatable apparatus includes a plate on each of an upper side and a lower side of the inflatable apparatus that causes the expandable apparatus to expand laterally during inflation.

8. The device according to claim 1, wherein an air vent is provided on the device extending through each of the body and inflatable apparatus between a first side of said cavity and a second side of said cavity yet prevents passage of debris therethrough as the body comprises open cell foam.

9. The device according to claim 1, wherein the device further includes an identification element that uniquely identifies the device.

10. The device according to claim 9, wherein the identification element is one or more of identifying indicia, a bar code, and an RFID tag.

11. The device according to claim 1, wherein the device includes one or more sensors that can monitor the environment within said cavity and optionally transfer information about said environment to a remote location outside the cavity.

12. The device according to claim 11, wherein the one or more sensors are connected to a lanyard having a display device connected thereto such that the property or properties measured by the sensor or sensors are displayable by the display device.

13. The device according to claim 1, wherein the body comprises a polymer, rubber, or a polymer foam.

14. A foreign material exclusion device, comprising:
a body that is adapted to seal a first side of a cavity in a construction or system from a second of side of said cavity, said body comprising a resilient or elastic material that can be compressed to fit into said cavity and then can be re-expanded to self-support the device within said cavity, said device further including an inflatable apparatus operatively connected to said body, wherein upon inflation, said inflatable apparatus also contacts desired surfaces of said construction or system and aids in maintaining said device at a desired location within said construction or system and also aids in forming a controlled seal between the first and second sides of the cavity, wherein the inflatable apparatus includes a stem that extends through the body from a first side to a second side, and wherein a fastener is connected to a distal end of the stem and operatively connects the inflatable apparatus to the body.

15. A foreign material exclusion device, comprising:
a body that is adapted to seal a first side of a cavity in a construction or system from a second of side of said cavity, said body comprising a resilient or elastic material that can be compressed to fit into said cavity and then can be re-expanded to self-support the device within said cavity, said device further including an inflatable apparatus operatively connected to said body, wherein upon inflation, said inflatable apparatus also contacts desired surfaces of said construction or system and aids in maintaining said device at a desired location within said construction or system and also aids in forming a controlled seal between the first and second sides of the cavity, wherein the inflatable apparatus includes a plate on each of an upper side and a lower side of the inflatable apparatus that causes the expandable apparatus to expand laterally during inflation.

16. A foreign material exclusion device, comprising:
a body that is adapted to seal a first side of a cavity in a construction or system from a second of side of said cavity, said body comprising a resilient or elastic material that can be compressed to fit into said cavity and then can be re-expanded to self-support the device within said cavity, said device further including an inflatable apparatus operatively connected to said body, wherein upon inflation, said inflatable apparatus also contacts desired surfaces of said construction or system and aids in maintaining said device at a desired location within said construction or system and also aids in forming a controlled seal between the first and second sides of the cavity, wherein an air vent is provided on the device extending through each of the body and inflatable apparatus between a first side of said cavity and a second side of said cavity yet prevents passage of debris therethrough as the body comprises open cell foam.

* * * * *